United States Patent
Schafer

(10) Patent No.: US 7,031,295 B2
(45) Date of Patent: Apr. 18, 2006

(54) SYSTEM AND METHOD FOR MINIMIZING GUARD TIME IN A TIME DIVISION DUPLEX COMMUNICATION SYSTEM

(75) Inventor: David C. Schafer, Bellevue, WA (US)

(73) Assignee: Harris Corporation, Melbourne, FL (US)

( * ) Notice: Subject to any disclaimer, the term of this patent is extended or adjusted under 35 U.S.C. 154(b) by 13 days.

(21) Appl. No.: 10/183,361

(22) Filed: Jun. 28, 2002

(65) Prior Publication Data
US 2003/0026215 A1 Feb. 6, 2003

Related U.S. Application Data

(60) Continuation-in-part of application No. 09/434,832, filed on Nov. 5, 1999, which is a division of application No. 08/740,332, filed on Nov. 7, 1996, now Pat. No. 6,016,313.

(51) Int. Cl.
*H04J 3/06* (2006.01)
(52) U.S. Cl. ...................................... 370/350
(58) Field of Classification Search ............... 370/328, 370/329, 330, 336, 337, 345, 347, 348, 276, 370/277, 280, 281, 465, 468, 350
See application file for complete search history.

(56) References Cited

U.S. PATENT DOCUMENTS

| | | | |
|---|---|---|---|
| 4,292,683 A * | 9/1981 | Jueneman | 370/324 |
| 4,747,160 A | 5/1988 | Bossard | |
| 5,420,851 A | 5/1995 | Seshadri et al. | |
| 5,710,765 A * | 1/1998 | Lee et al. | 418/36 |
| 5,768,254 A | 6/1998 | Papadopoulos et al. | |
| 5,802,046 A * | 9/1998 | Scott | 370/280 |
| 5,802,061 A * | 9/1998 | Agarwal | 370/461 |
| 5,809,431 A | 9/1998 | Bustamante et al. | |
| 5,828,695 A | 10/1998 | Webb | |
| 5,890,055 A | 3/1999 | Chu et al. | |
| 6,006,069 A | 12/1999 | Langston | |
| 6,016,311 A | 1/2000 | Gilbert et al. | |
| 6,381,226 B1 * | 4/2002 | Choi | 370/316 |
| 6,633,559 B1 * | 10/2003 | Asokan et al. | 370/350 |

* cited by examiner

*Primary Examiner*—Kwang Bin Yao
(74) *Attorney, Agent, or Firm*—Duane Morris LLP

(57) ABSTRACT

Disclosed is a system and method for optimizing capacity in a multi-user time division duplex ("TDD") communication system such as a broadband wireless radio frequency communication system. More specifically the invention minimizes guard time in duplexed signals to thereby allow for higher data throughput which results in an increase in system communication capacity. Depending upon instantaneous traffic load associated with the subscribers using a particular TDD carrier, guard times may be adjusted to provide a desired level of throughput. As traffic loads demand, the order of assignment of burst periods in either or both the transmit and receive frames of a TDD carrier with respect to the subscriber systems operable thereon are adjusted to accommodate desired guard times.

6 Claims, 3 Drawing Sheets

SYSTEM AND METHOD FOR MINIMIZING GUARD TIME IN A TIME DIVISION DUPLEX COMMUNICATION SYSTEM

RELATED APPLICATIONS

The present application is a continuation-in-part application of commonly assigned, U.S. patent application Ser. No. 09/434,832, entitled "System and Method for Broadband Millimeter Wave Data Communication" filed Nov. 5, 1999, which itself is a divisional of commonly assigned, U.S. patent application Ser. No. 08/740,332, entitled "System and Method for Broadband Millimeter Wave Data Communication" filed Nov. 7, 1996, now U.S. Pat. No. 6,016,313, currently undergoing concurrent re-examination as re-examination application Ser. Nos. 90/005,726 and 90/005,974 the disclosures of which are hereby incorporated herein by reference.

The present application is also related to co-pending, commonly assigned, U.S. patent application Ser. No. 09/327,787, entitled "Multi-Level Information Mapping System and Method" filed Jun. 7, 1999, and to commonly assigned U.S. patent application Ser. No. 09/604,437, entitled "System and Method for Maximizing Efficiency in a Time Division Duplex System Employing Dynamic Asymmetry," the disclosures of which are incorporated herein by reference.

BACKGROUND OF THE INVENTION

This invention relates to broadband radio frequency communication systems and methods and more particularly to a system and method for optimizing capacity in multi-user time division duplex communication systems through minimizing guard times utilized in the duplexed signals.

In the past, information communication between processor-based systems, such as local area networks (LAN) and other general purpose computers, separated by significant physical distances has been an obstacle to integration of such systems. The choices available to bridge the physical gap between such systems have not only been limited, but have required undesirable tradeoffs in cost, performance, and reliability.

One group of historically available communication choices includes such solutions as the utilization of a standard public switch telephone network (PSTN) or multiplexing signals over an existing physical link to bridge the gap and provide information communication between the systems. Although such solutions are typically inexpensive to implement, they include numerous undesirable traits. Specifically, since these existing links are typically not designed for high speed data communication, they lack the bandwidth through which to communicate large amounts of data rapidly. As in-building LAN speeds increase to 100 Mbps, the local PSTN voice grade circuits even more markedly represent a choke point for broadband metropolitan area access and therefore are becoming a less and less desirable alternative. Furthermore, such connections lack the fault tolerance or reliability found in systems designed for reliable transmission of important processor-based system information.

Another historically available group of communication choices is found at the opposite end of the price spectrum than those mentioned above. This group includes such solutions as the utilization of a fiber optic ring or point to point microwave communication. These solutions are typically cost prohibitive for all but the larger users. The point to point systems require a dedicated system at each end of the communication link which lacks the ability to spread the cost of such systems over a plurality of users. Even if these systems were modifiable to be point-to-multipoint, to realize the economy of multiple system use of some system elements, the present point-to-point microwave systems would not provide broadband data services but rather traditional bearer services such as T1 and DS3. Furthermore, these systems typically provide a proprietary interface and therefore do not lend themselves to simple interfacing with a variety of general purpose processor-based systems.

Although a fiber optic ring provides economy if utilized by a plurality of systems, it must be physically coupled to such systems. As the cost of purchasing, placing, and maintaining such a ring is great, even the economy of multi-system utilization generally does not overcome the prohibitive cost of implementation.

A need therefore exists in the art of information communication for a communication system providing cost effective bridging of large physical distances between processor-based systems.

A further need exists in the art for a communication system providing high speed broadband information communication between processor-based systems.

A still further need exists in the art for a communication system and method of operation which efficiently utilizes the available spectrum in order to provide optimized information throughput.

A still further need exists in the art for a fault tolerant communication system providing reliable bridging of physical gaps between processor-based systems.

Additionally, a need exists in the art for a broadband communication system providing simple connectivity to a variety of processor-based systems and communication protocols, including general purpose computer systems and their standard communication protocols.

These and other objects, needs and desires are achieved by a system and method of communication in which a communication array (referred to herein as a hub), is centrally located to provide communication links to a plurality of physically separated subscriber processor-based systems, or other sources of communication such as voice communication, using a communication device (referred to herein as a node, which together with the subscriber processor-based system is referred to herein as a remote system or subscriber system) of the present invention to efficiently utilize available communication spectrum. Preferably, this central array may be physically coupled to an information communication backbone providing communication between air linked systems and physically linked systems. Furthermore, multiple ones of such system may be utilized to bridge large physical separation of systems by the inter-communication of multiple central arrays. Moreover, pervasive surface coverage may be provided by arranging a plurality of such communication arrays to provide a cellular like overlay pattern.

In a preferred embodiment, the communication spectrum utilized by the communication system is frequency division multiplexed (FDM) to provide multiple channels or carriers for simultaneous information communication to a plurality of subscribers. Moreover, a preferred embodiment subscriber system is adapted to be dynamically controllable to select between ones of the FDM carriers utilized by the communication system.

Preferably a carrier frequency in the millimeter wavelength spectrum, such as 10 to 60 GHz, is used by the present invention. Such carrier frequencies are desirable in order to provide a communication bandwidth sufficient for the transmission of at least 30 Mbps through each defined FDM channel of approximately 10 MHz. However, it shall be appreciated that the concepts of the present invention are applicable to portions of the spectrum other than millimeter wavelengths. For example, the present invention is particularly well suited for use in lower frequency bands, such as those in the 300 MHz to 3 GHz range, where radiation of signals are not as confined to line-of-sight as those of the millimeter wavelength spectrum.

Time division multiplexing (TDM) is preferably utilized to provide multiple, seemingly simultaneous, communications on a single carrier channel. Here ones of the FDM channels are broken down into a predetermined number of discrete time slices (burst periods) which form a frame. Each burst period may be utilized by a different subscriber so as to result in information communication contained in a single frame, having a number of TDM bursts, being directed to/from a number of subscribers over a single FDM channel.

Moreover, full duplexing may be synthesized on a single carrier channel by time division duplexing (TDD) through the use of burst periods like those used in TDM. Through TDD, Tx and Rx frames, each frame having one or more burst periods, are defined to provide communication in a particular direction at a predefined time. According to a most preferred embodiment, TDD of the present invention is adaptive (ATDD) to provide for dynamic sizing of the Tx and Rx frames. For example, allocation of burst periods to either a Tx frame or Rx frame may be based on the instantaneous traffic demands of the subscriber systems.

Preferably timing adjustment techniques are employed with respect to burst periods of a multi-user TDD frame. For example, where one subscriber system using data of a TDD frame is disposed more near a hub site and another subscriber system using data of the TDD frame is disposed more remote from the hub site, a preferred embodiment of the present invention utilizes timing advance techniques with respect to burst periods of the hub Rx frames in order to properly time align reverse link transmission at the hub site.

However, the use of timing adjustment techniques, such as the above mentioned timing advance, creates a potential for burst period overlap in multi-user systems. For example, a subscriber system operating in the first burst period of the Rx frame of a TDD frame may be advanced to the point that it begins transmission during the last burst period of the Tx frame of the TDD frame.

The above described problem with burst period overlap may be addressed by providing a sufficiently long guard time between the Tx and Rx frames of a TDD frame. However, such a solution if not carefully implemented leaves the available spectrum idle for periods of time in which communications may take place, thus decreasing the throughput theoretically possible with the available spectrum. Accordingly, the preferred embodiment of the present invention includes timing adjustment techniques adapted to efficiently utilize the available spectrum in order to provide optimized information throughput.

The preferred embodiment of the present invention enables the guard time between the forward and reverse links of a TDD carrier to be adjusted for optimization of communications. Accordingly, depending upon instantaneous traffic load associated with the subscribers utilizing a particular TDD carrier, guard times may be adjusted to provide a desired level of throughput. According to a most preferred embodiment, as traffic loads demand, the order of assignment of burst periods in either or both of the Tx and Rx frames of a TDD carrier with respect to the subscriber systems operable thereon are adjusted to accommodate desired guard times. For example, the order of subscriber systems on the reverse and/or forward links may be arranged to correspond to their distance from the hub in order to allow guard times to be reduced to a minimum. Preferably, determination of the guard time required for any such instantaneous traffic demands is based upon the smallest propagation delay associated with a subscriber system of the multiple users of the TDD carrier, i.e., the subscriber system disposed closest to the hub.

In the preferred embodiment, the communication system may utilize an algorithm, perhaps at initialization and/or continuously or periodically during use, to poll subscriber's systems or otherwise monitor communication attributes with respect to operation of hubs and nodes, and preferably various elements thereof, of the communication system. This communication attribute information may be utilized to determine the optimum assignment of resources, including antenna elements, TDM burst periods, FDM frequency assignments, and/or TDD Tx and Rx time assignments for each such system. For example, propagation delay information with respect to the nodes operating with a hub derived by the above algorithm during an initialization or acquisition process may be used to determine timing advance information and/or the distance from the hub site and the subscriber systems for use in TDD Tx and/or Rx time assignments.

A technical advantage of the present invention is provided by the optimization of communications based on the communication attributes of the system.

A further technical advantage of the present invention is provided by the determination of a minimum guard time between the forward and reverse links of a TDD carrier to optimize use of the available spectrum.

A still further technical advantage of the present invention is that variable guard times in a TDD carrier are supported to allow optimization based on the deployment of subscriber systems and/or the traffic loading of the system.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
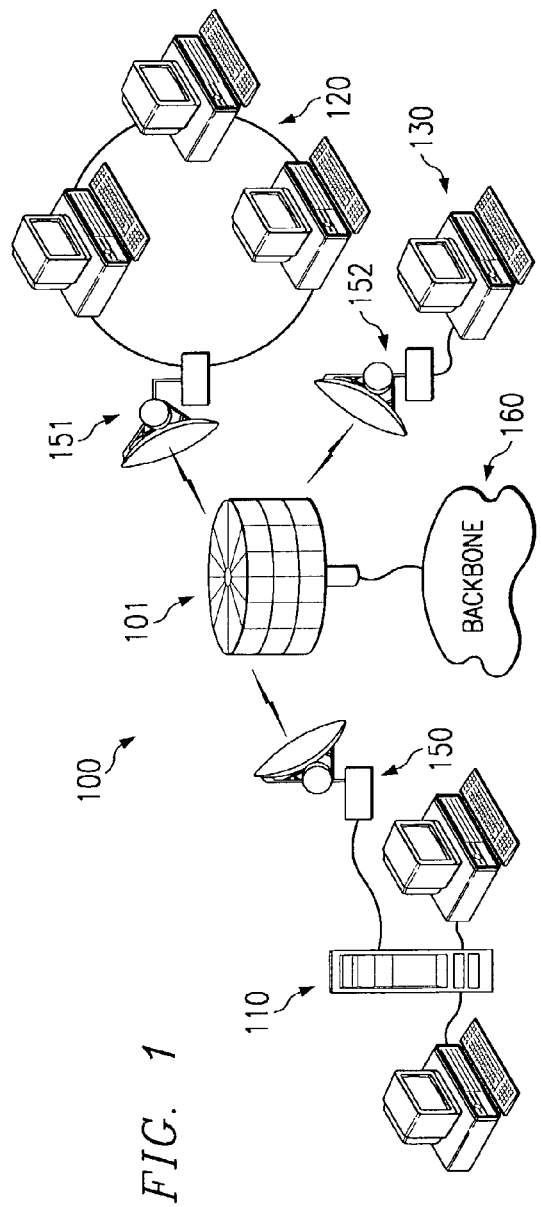
FIG. 1 illustrates a communication network in which the present invention may be utilized.

The present invention provides high speed data communication via an air interface allowing data access to and from subscriber's remotely located systems. Referring to FIG. 1, it can be seen that such wireless communication may be utilized, for example, to provide high speed bridging of a physical gap between a plurality of processor-based systems, as illustrated by system 100. The processor-based systems may include local area networks (LAN), such as LANs 110 and 120, or individual computer systems, such as PC 13 0. It shall be appreciated that the processor-based systems utilizing the present invention may be general purpose computers, both standing alone and interconnected such as by a LAN. Furthermore, the system can connect other communication systems such as voice or video in combination with, or in place of, communication sourced by the above mentioned processor-based systems.

Systems bridged by the present invention may utilize a communication device, hereinafter referred to as a "node," for communicating with a centralized communication device also of the present invention, hereinafter referred to as a "hub." Still referring to FIG. 1, a hub is illustrated as element 101 and several nodes are illustrated as elements 150, 151, and 152 connected to LANs 110 and 120 as well as to PC 130, the combinations of which provide remote or subscriber systems.

Also, as illustrated in FIG. 1, such wireless communication may be utilized to provide high speed communication between a processor-based system, having a node coupled thereto, and communication backbone, such as backbone 160, through hub 101. It shall be understood that backbone 160 may be any form of communication means, such as a broadband fibre-optic gateway or other broadband data grade connection, T1 communications lines, a cable communication system, the Internet, or the like, physically connected to hub 101. Moreover, backbones, such as illustrated by backbone 160, may be utilized to interconnect a plurality of hubs into a communications network.

Figure 2:
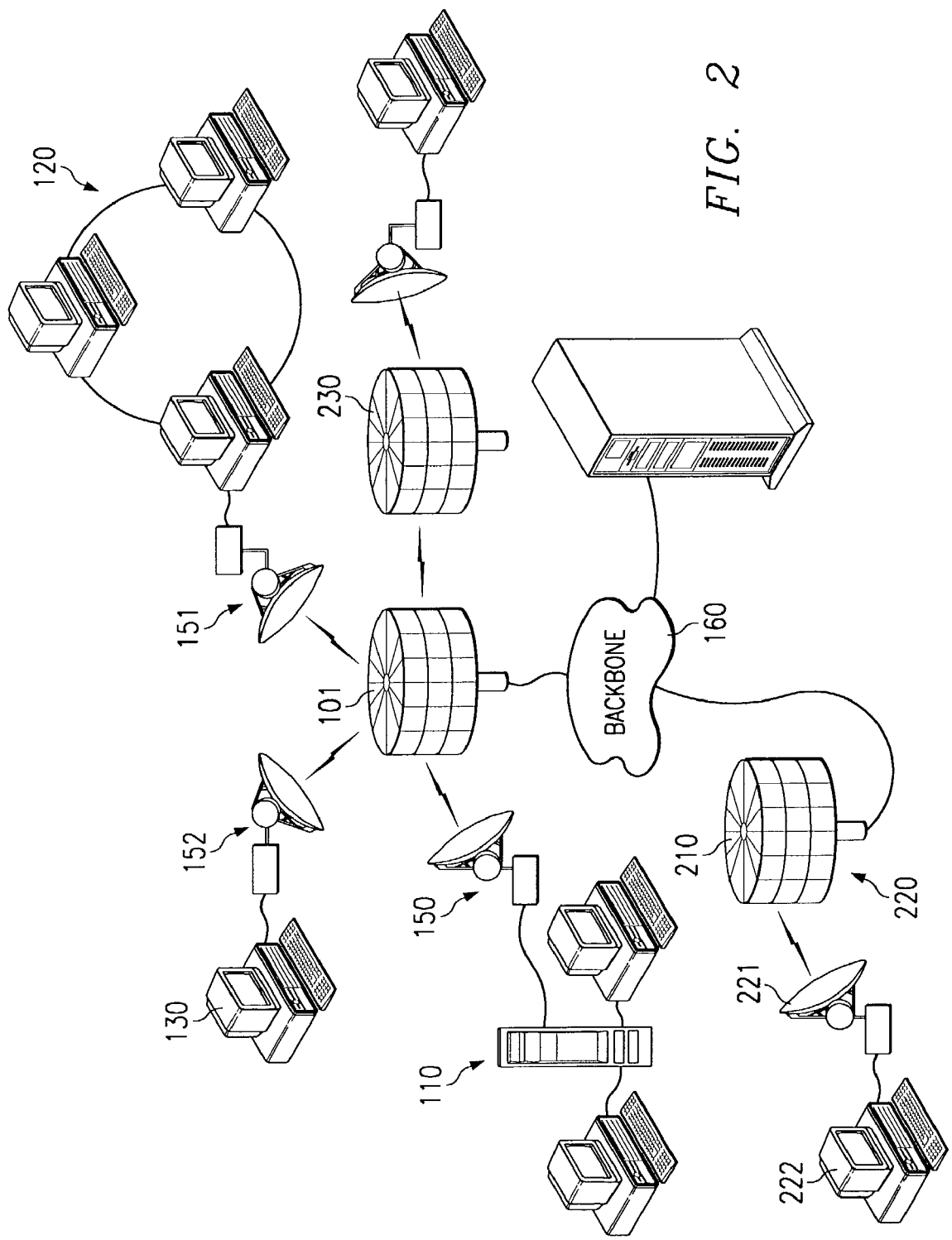
FIG. 2 illustrates an alternative embodiment communication network in which the present invention may be utilized.

Larger geographical distances between two communicating processor-based systems may be bridged by utilization of multiple hubs. A communication network comprising a plurality of hubs is illustrated in FIG. 2. As illustrated in FIG. 2, hubs 101 and 230 are in communication through an air link via antenna elements. These two hubs may provide information communication between any combination of processor-based systems in communication with either hub.

Through such a network, a node, such as node 150, in direct communication with one hub, such as hub 101, may communicate with a node, such as node 221, in direct communication with another hub, such as hub 220. Such communication may be accomplished through the two hubs interconnection via a backbone, such as backbone 160. Of course, it shall be understood that intercommunication between hubs may be accomplished through information "back-hauling" via air gap communication between two hubs such as is illustrated with hubs 101 and 230. It shall be appreciated that a communications network may include any number of hubs in communication with other hubs, through such means as air gap or direct backbone interconnection, or the like. Information communicated from a node in direct communication with one hub may be routed through various such interconnections to a node in direct communication with any hub of the communication network.

Preferably the hubs utilized according to the present invention provide communication services to a plurality of subscriber systems, such as does hub 101 of FIGS. 1 and 2. Accordingly, carrier channels utilized in communications between the hub and subscriber systems are preferably divided into predefined TDMA time slots or burst periods. These TDMA time slots may be utilized to communicate user information and/or control information. For example, a TDMA time slot may be broken down into control channel information and user information, such as may be a user information data packet formatted for a particular predefined protocol. There are innumerable methods by which to utilize the above disclosed frequency spectrum for communication. It shall be understood that any such method may be utilized according to the present invention.

Using the TDMA time slots of the preferred embodiment, a single carrier channel may be utilized to communicate with multiple ones of the subscriber systems operable with a particular hub. For example, a single carrier channel having three burst periods associated therewith may be utilized by hub 101 to provide communications to each of nodes 150–152.

Time division duplexing (TDD) is the preferred means by which a full duplex link between the hub and a node or subscriber is enabled. Accordingly, a carrier channel is divided into a forward link portion, or Tx frame, and a reverse link portion, Rx frame. Each Tx and Rx frame of a TDD carrier channel is preferably divided into discrete burst periods to provide for TDMA utilization of each channel.

Figure 3B:
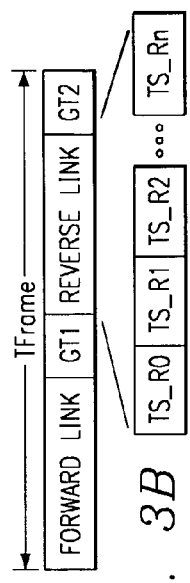
FIGS. 3A–3C illustrates a time division duplex frames of the present invention.
Figure 3A:
Figure 3C:
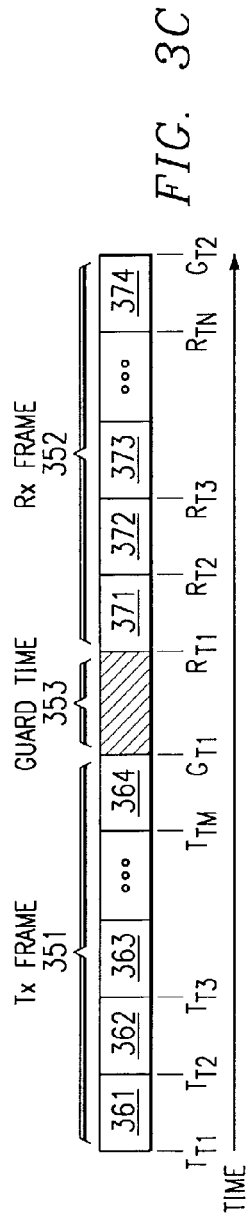

A preferred embodiment carrier channel providing TDD communication with TDMA burst periods is shown in FIGS. 3A through 3C. Shown in FIGS. 3A and 3B are a TDD frame consisting of a forward link or transmit frame and a reverse link or receive frame having guard times GT1 and GT2, respectively, to provide separation from a next frame or frame portion. Each of the forward link frames and reverse link frames of the TDD frame may be further divided into time division multiple access (TDMA) burst periods. These TDMA bursts are shown with respect to the transmit frame as time slots TS_Fc, TS_F0, TS_F1 and TS_Fm in FIG. 3A, where time slot TS_Fc is preferably associated with a control channel and time slots TS_F0 through TS_Fm are preferably associated with subscriber payload data. Similarly, TDMA bursts are shown with respect to the receive frame as time slots TS_Rc, TS_R0, TS_R1, and TS_Rn, where time slot TS_Rc is preferably associated with a control channel and time slots TS_R0 through TS_Rn are preferably associated with subscriber payload data.

Shown in FIG. 3C are TDD Tx frame 351 and Rx frame 352, such as may correspond to the forward link or transmit frame and reverse link or receive frames of FIGS. 3A and 3B discussed above. Each Tx and Rx frame of FIG. 3C is divided into burst periods, such as burst periods 361–364 of Tx frame 351, associated with time index $T_{T1}$–$T_{TM}$ respectively, and burst periods 371–374 of Rx frame 352, associated with time index $R_{T1}$–$R_{TN}$ respectively. It should be appreciated that the frame lengths of the Tx and Rx frame may be adjusted according to the present invention to provide asymmetry in the duplex communications or adaptive time division duplexing (ATDD).

It shall be understood that the burst periods of each Tx and Rx frame may be utilized by a single antenna element to provide carrier channel TDMA to one node or multiple nodes located within the antenna element's radiation pattern. For example, burst periods 1 and 2 may be used by an antenna element to provide communication to a first node while burst periods 3 through 7 are used by the same antenna element to provide communication to a second node. Likewise, a single Tx or Rx frame may be utilized by different antenna elements. For example, burst periods 1 through 4 may be used by a first antenna element to provide communication to a first node while burst periods 5 through 8 are used by a second antenna element to provide communication to a second node.

It shall be appreciated that combinations of the above mentioned TDMA use of the burst periods by a single antenna element and division of Tx and Rx frames between different antenna elements may be utilized by the present invention. For example, burst periods 1 and 2 may be used by an antenna element to provide TDMA communication to a first node and second node while burst periods 3 and 4 are used by a second antenna element to provide communication to a third node.

Also shown in FIG. 3C is guard time 353, associated with time index $G_{T1}$, disposed in the carrier channel between Tx frame 351 and Rx frame 352. This guard time is a channel idle time to allow for different propagation delays associated with various ones of the subscriber systems in communication with the hub. It shall be appreciated that in addition to or in the alternative to guard time 353, a guard time (such as shown in FIGS. 3A and 3B) may be utilized in the transition from a Rx frame to a Tx frame, such as between Rx frame 352 and a Tx frame following thereafter.

As RF spectrum is often expensive and usually limited in availability, the present invention is preferably adapted to efficiently utilize spectrum allocated for use therewith. Accordingly, the preferred embodiment of the present invention employs techniques to reduce and/or eliminate times at which the RF spectrum of a carrier channel is not utilized for the communication of information.

Figure 4:
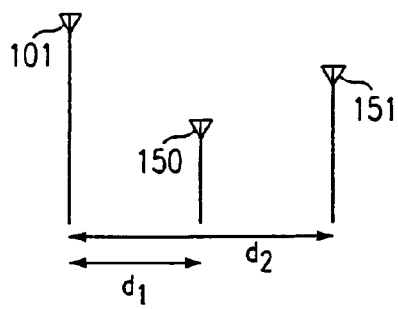
FIG. 4 illustrates the disposition of nodes at different distances from a centralized hub.

For example, in a multi-user system, ones of the subscriber systems may be disposed in positions having different distances from the hub they are in communication with. Directing attention to FIG. 4, nodes 150 and 151 are shown in a deployment wherein node 150 is disposed distance $d_1$ from hub 101 and node 151 is disposed distance $d_2$ from hub 101, wherein $d_1 < d_2$. A finite amount of time is required for the propagation of a RF signal through free space, which amount of time is directly associated with the distance of free space propagation. Accordingly, it can be expected that there will be a finite difference ($\Delta_T$, where $\Delta_T$ is a function of $d_2 - d_1$) in the time for a signal to propagate from node 150 to hub 101 as compared to a signal propagating from node 151 to hub 101. If an Rx frame, as received by hub 101, is to include contiguous burst periods as illustrated in FIG. 3C, transmission of a Rx frame burst by node 151 should be time advanced by an amount of time equivalent to this time difference, $\Delta_T$, to accommodate this propagation difference. For example, if node 151 is associated with burst period 371 and node 150 is associated with burst period 372 and node 150 transmits burst period 372 at time index $R_{T2}$, node 151 should transmit burst period 371 at time index $R_{T1} + \Delta_T$ for the burst periods to be received contiguously by node 101.

The above described technique of adjusting transmission times for propagation delays, referred to herein as timing advance, is employed by the preferred embodiment of the present invention to avoid unnecessary idle time at the hub.

It should be appreciated that the use of such timing advance at the subscriber systems typically will not introduce any additional idle time as these systems are relegated to waiting for a particular associated burst period or periods and adjusting their relative timing one direction or the other generally will not affect operation thereof.

Figure 5:
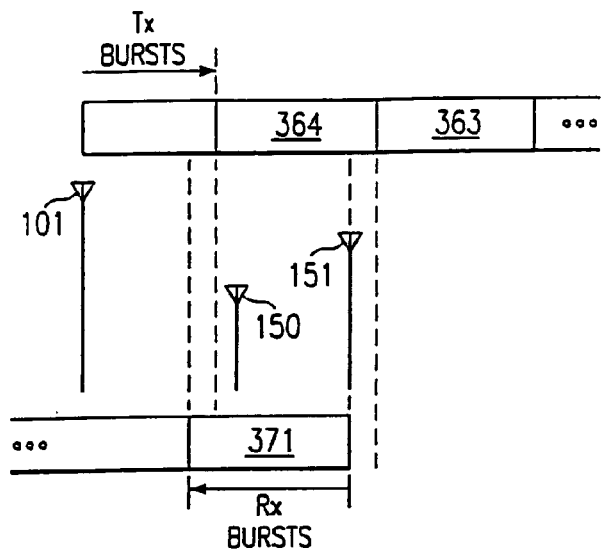
FIG. 5 illustrates timing issues of advanced time slot transmissions associated with the nodes disposed at different distances from the centralized hub.

The preferred embodiment of the present invention provides for multi-user access to a particular carrier channel by assigning ones of the burst periods therein to the subscriber systems sharing the carrier channel. Accordingly, depending on the relative positions of these subscriber systems and their assignment to the frame burst periods for use, the use of timing advance to provide a contiguous Rx frame at the hub, or other timing adjustment techniques wherein ones of the subscriber systems are receiving and/or transmitting on a schedule which is asynchronous with respect to other ones of the subscriber systems, may result in burst period overlap. For example, directing attention to FIG. 5, node 151 may be operating in burst period 371 of the Rx frame of FIG. 3C wherein transmission of burst period 371 is advanced $\Delta_T$ by node 151. However, because of the distance between node 151 and hub 101, transmission of burst period 371 by node 151 is advanced to the point that its transmission overlaps the propagation of burst period 364 of the Tx frame within portions of the cell. As shown in FIG. 5, if node 150 is operating in burst period 364, node 150 may be receiving its forward link transmission when node 151 is transmitting its reverse link transmission and/or the signal of node 151 is propagating by node 150, thus resulting in undesired interference.

The above described problem with burst period overlap may be addressed by providing a sufficiently long guard time between the Tx and Rx frames of a TDD frame. For example, one solution may be to provide a guard time between the Tx and Rx frames large enough to accommodate the round trip propagation delay at the maximum coverage extent of the cell, i.e., the round trip propagation delay from the hub to the cell boundary. Such a cell absolute worst case guard time would accommodate timing advance associated with a node disposed at any position in the cell regardless of the particular burst periods assigned to the subscriber systems. Regardless of the relative placement of the subscriber systems and the order in which any subscriber system communicates in a frame, there could be no overlap when using a cell absolute worst case guard time. This is because the cell absolute worst case guard time is of sufficient length to allow even a node disposed at the very edge of the cell to operate on the last burst period of the Tx frame (which will be propagation delayed approximately the propagation delay to the edge of the cell) with a nearby node operating on the first burst period of the Rx (timing advanced an amount equal to the propagation delay from that node to the hub, which will be approximately the propagation delay to the edge of the cell), to complete reception of the Tx burst prior to transmission of the Rx burst period.

In very small cells, such as those associated with the urban microcells of cellular telephony, a cell absolute worst case guard time (a guard time associated with the round trip propagation delay of the cell boundary) may be an acceptable length of time, i.e., the total potential for reduction of the length of the guard time is not great enough to justify the development and implementation of a more elegant solution. However, it is envisioned that systems of the present invention will communicate over relatively large distances. For example, it is anticipated that communication systems of the present invention operating at frequencies around 38 GHz will provide cellular coverage extending out to approximately 10 kilometers from the hub. Moreover, where lower frequencies are utilized, such as 28 GHz, 24 GHz, or even below the gigahertz range of frequencies, it is expected that even larger distances will be bridged. Accordingly, it should be appreciated that if the above described guard times adjusted for the worst case propagation delay in the cell were utilized, the guard times could occupy a substantial amount of the available spectrum. This would result in a significant amount of idle time at the hub wherein the carrier channel is not in use. This idle time equates to the loss of theoretically achievable capacity, i.e., if the interference problems of overlapping burst periods could otherwise be solved, the guard time, or a portion thereof, could be used to carry burst periods.

Accordingly, the preferred embodiment of the present invention includes timing adjustment techniques adapted to efficiently utilize the available spectrum in order to provide optimized information throughput, rather than applying a brute force guard time associated with a worst case cell propagation delay. The preferred embodiment of the present invention enables the guard time between the forward and reverse links of a TDD carrier to be adjusted for optimization of communications. Accordingly, depending upon instantaneous traffic load associated with the subscribers utilizing a particular TDD carrier, guard times may be adjusted to provide a desired level of throughput.

Preferably, a guard time utilized according to the present invention is minimized to maximize a carrier channel duty cycle for the servicing of traffic demands. Accordingly, the present invention adjusts allocation of resources to the systems operable therewith to thereby utilize a communication attribute minimized guard time.

In a preferred embodiment, the communication system utilizes an algorithm, perhaps at initialization and/or continuously or periodically during use, to poll subscriber's systems or otherwise monitor communication attributes with respect to operation of hubs and/or nodes, and preferably various elements thereof, of the communication system. The communication attribute algorithm is preferably operable upon a processor (CPU) and associated memory (RAM) of a hub of the present invention. Of course, additional and/or other apparatus, such as a general purpose processor based computer system, may be utilized for operation of the communication attribute information algorithm of the present invention.

Communication attribute information acquired by such an algorithm may include information regarding each node's relative distance from the hub (i.e., propagation delay information associated with each node useful in determining a timing advance for an associated node), particular antenna beams, sectors, carrier channels, burst periods, and the like, that communications with particular nodes may be conducted upon, communication quality information such as signal strength, signal to noise ratio, and carrier to interference ratio, historical communication information such as traffic demands of particular nodes, and/or like communication information. Additional communication information relevant to establishing communications according to the present invention may be provided to the system, such as stored in association with the above described communication attribute information, including minimum capacity to be provided to particular nodes, quality of service to be maintained with respect to particular nodes, and the like. This communication information is preferably utilized to determine the optimum assignment of resources, including antenna elements, TDM burst periods, FDM frequency assignments (carrier channel assignments), and/or TDD Tx and Rx time assignments for each such system.

According to the preferred embodiment of the present invention, a traffic scheduler or traffic schedulers are utilized to monitor the instantaneous traffic demands of the carrier channels of an interference group to thereby determine the appropriate assignment of resources as described above. The traffic scheduler of the preferred embodiment is operable upon a processor (CPU) and associated memory (RAM) of a hub of the present invention. Of course, additional and/or other apparatus, such as a general purpose processor based computer system, may be utilized for operation of the traffic scheduler of the present invention.

Figure 6:
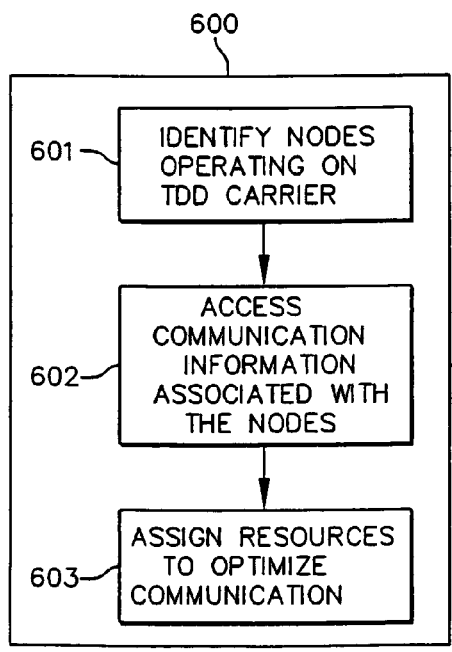
FIG. 6 illustrates a flow diagram of a preferred embodiment traffic scheduler of the present invention.

Operation of the preferred embodiment traffic scheduler is shown in the high level flow diagram of FIG. 6. As shown therein, the preferred embodiment traffic scheduler preferably identifies nodes operating on a TDD carrier channel (step 601). It should be appreciated that the nodes operating on a same TDD carrier channel are highly likely to cause interference with other ones of the nodes and, therefore, should be considered in minimizing a guard time of that TDD channel. However, it should also be appreciated that other nodes, both within the cell and external thereto, may be a source of interference. For example, inter-carrier interference, such as associated with the various sidebands of carriers relatively close in frequency, may be of such a magnitude that additional nodes, including nodes operating on different carrier channels, should also be identified for optimization of communications by the traffic scheduler. Accordingly, an interference group of nodes, i.e., particular nodes determined to cause and/or receive undesired levels of interference levels from other nodes of the group, may be identified by the traffic scheduler at step 601.

The preferred embodiment traffic scheduler/controller 600 accesses communication information associated with the identified nodes (step 602). This communication information may be accessed from a memory 604 as shown in FIG. 6. Having accessed the communication information, the traffic scheduler is able to intelligently make determinations with respect to the assignment of resources based on such considerations as the relative placement of the nodes with respect to the hub, the ability of particular ones of the nodes to operate on different carrier channels, the capacity requirements of ones of the nodes, etc. Accordingly, thereafter the preferred embodiment traffic scheduler assigns resources for use by the nodes to achieve optimized communications (step 603), including minimizing the length of a TDD guard time utilized.

Figure 7:
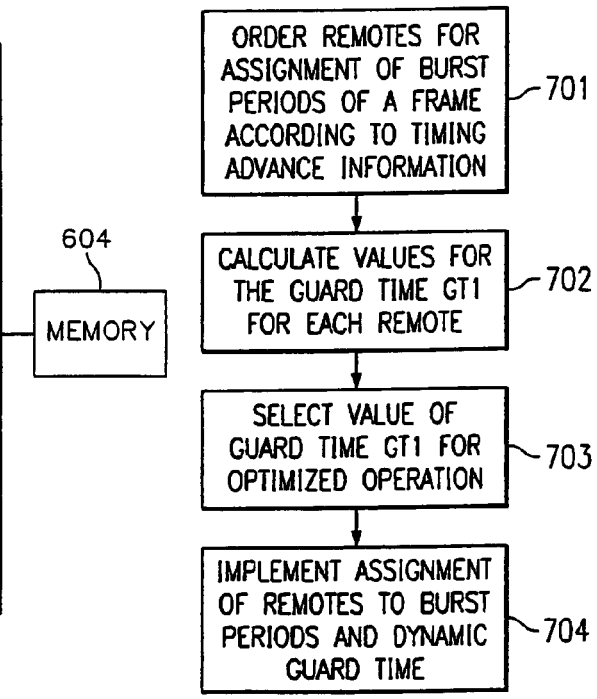
FIG. 7 illustrates a flow diagram of the assigning of resources according to a preferred embodiment of the present invention.

Directing attention to FIG. 7, more detail with respect to the optimization of communications by the preferred embodiment traffic scheduler of FIG. 6 is shown. Specifically, the steps illustrated in FIG. 7 a performed as part of a preferred embodiment of the assignment of resources to optimize communication step (step 603) of FIG. 6.

According to the preferred embodiment of FIG. 7, at step 701 the remotes are ordered for assignment of burst periods of a frame to facilitate guard time optimization according to the present invention. According to a most preferred embodiment, as traffic loads demand, the order of assignment of burst periods in either or both of the Tx and Rx frames of a TDD carrier with respect to the subscriber systems operable thereon are adjusted to accommodate desired guard times. The preferred embodiment of FIG. 7 orders the remotes according to timing advance information. For example, the communication information associated with the nodes accessed at step 602 of FIG. 6 may access a timing advance value for each node, such as may be determined during a normal initialization or acquisition process and/or which may be dynamically updated, such as based upon monitored communication conditions and/or attributes. Preferably the order of the remotes as provided at step 701 smallest to largest timing advance value, i.e., smallest timing advance value being assigned a first time slot of the frame with the succeeding time slots of the frame assigned to remotes having incrementally larger timing advance values. Of course, other and/or additional information may be utilized for ordering remotes for assignment of burst periods. For example, where a plurality of remotes have a same timing advance value, communication information such as a signal strength indicator may be utilized to select a particular remote of the plurality to assign to each successive time period of a plurality of time periods.

It should be appreciated that the preferred embodiment of FIG. 7 does not rely upon the distance of particular remotes from the hub in determining a burst period assignment order, but rather relies upon the value of the timing advance utilized thereby. This is preferred as the timing advance information is preferably determined in an initialization or acquisition phase which determines an actually experienced propagation delay and, therefore, the electrical distance from the hub. This electrical distance may incorporate delays associated with an indirect signal path, such as a reflected signal utilized when a remote is deployed in a shadow or other deep fade area or other communication anomalies causing there to be a discrepancy between a physical distance and the electrical distance. As it is this propagation delay or electrical distance that the present invention seeks to accommodate and thereby optimize the requirement, if any, for a guard time, it is this information that the preferred embodiment utilizes instead of a simple distance measurement.

At step 702 the traffic scheduler calculates values for the guard time for each remote. According to a most preferred embodiment these guard times are calculated as follows:

$$GT1\_required\_remote(0) = time\_advance(ts\_r0)$$

$$GT1\_required\_remote(k) = time\_advance(ts\_rk) - \sum_{x=0}^{x=(k-1)} timeslot-duration(ts\_Rx)$$

wherein GT1_required_remote(0) is the calculated guard time for the remote assigned the first time slot in the frame and GT1_required_remote(k) is the calculated guard time for each successive remotes assigned to the frame. According to the above formulas of the most preferred embodiment, the calculated guard time for the first remote is its timing advance value, i.e., the time associated with signal propagation between the hub and the remote in one link direction. This value for the guard time is selected for this remote because this is the minimum guard time required by this remote in order to avoid its transmission in the reverse link of FIG. 3C overlapping the hub's transmissions in the forward link of FIG. 3C. The calculated guard times for the remaining remotes are that remote's timing advance value minus the sum of any preceding remotes' time slot durations, i.e., the time associated with signal propagation between the hub and the remote in one link direction minus the amount of time associated with each preceding time slot in one link direction of this particular frame. This value for the guard time is selected for these remotes because it is not necessary according to the present invention to provide a guard time for the full propagation delay associated with these remotes since there is at least a portion of this propagation time which is used by other remotes in transmitting in this link direction due to the above described ordering of the remotes.

It should be appreciated that the above described guard time calculations may result in a negative result for some remotes. Accordingly, a preferred embodiment of the present invention sets the guard time for a particular remote to zero when a calculated guard time is negative. However, alternative embodiments of the present invention may utilize negative guard times as calculated, such as for providing timing advances in certain propagation conditions. At step 703 the traffic scheduler selects a value of guard time (the dynamically implemented guard time) from the above guard times calculated for each remote for the optimization of the system according to the present invention. According to a most preferred embodiment the dynamically implemented guard time is selected according to the following formula:

$$GT1\_dynamic = MAX(GT\_required\_remote(n))$$

Accordingly, this preferred embodiment selects as the dynamically implemented guard time by choosing the largest value of the guard times calculated for each remote in order to provide a guard time which accommodates all remotes and yet which is minimized so as to allow the maximum use of spectrum.

At step 704 the traffic scheduler implements assignment of the remotes to the burst periods and implements a frame having the above determined dynamic guard time. It should be appreciated that the preferred embodiment of FIG. 7 is operable for each frame communicated. Of course, other implementation intervals may be selected, if desired. For example, the determination and/or assignment of dynamically implemented guard times may be implemented upon a superframe basis, such as to reduce the amount of computing power/resources utilized according to the present invention.

According to the preferred embodiment the above steps of the traffic scheduler are preferably implemented with respect to a guard time between the transmit and receive frames of a centralized communication system, such as the aforementioned hub while a different technique is utilized for a guard time between the receive and transmit frame of the centralized communication system. This is because the plurality of remote communication systems, such as the aforementioned nodes, may each be disposed a different distance from the centralized communication system and thus the frame elements associated with their transmission of data may be time advanced to provide contiguous or substantially contiguous frames at the centralized communication system. According to the preferred embodiment, the centralized communication system transmits the forward link frame portions without advance and, therefore, subsequent to completion of reception of the previous reverse link frame portions by the centralized communication system. Therefore, no guard time is necessary to prevent frame overlap of the transmit frame portion and the receive frame portion in such a system. Of course, an amount of guard time may be desirable between the receive frame portion and the transmit frame portion, such as to accommodate a switch from transmit to receive by communication system equipment. Accordingly, this guard time may be hardware driven in particular cases.

However, it should be appreciated that the concepts of the present invention may be utilized in any number of links and link directions. For example, the above described dynamic guard time may be determined for both a forward and reverse link if desired. Additionally, the dynamic guard time may be determined for a reverse link to forward link frame transition rather than the above described forward link to reverse link frame transition, such as where a hub advances forward link transmissions to offset propagation delays of the forward link.

It should be appreciated that, although a preferred embodiment of the present invention has been described herein with reference to an air link, the concepts of the present invention are applicable to links provided through any number of media. For example, wireline communications may benefit from application of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for controlling scheduling of information communication in a time division duplex communication environment, said system comprising:

a memory storing propagation delay information for a plurality of nodes in communication with a hub; and a controller in communication with said memory and operable under control of an instruction set to determine a time slot assignment having a determination of an order of ones of said plurality of nodes to be provided communications in a communications frame, said time slot assignment to be implemented in said time division duplex communication environment to minimize a guard time thereof through reference to said stored propagation delay information, and said order of ones of said plurality of nodes is determined at least in part from a hierarchy of said stored propagation delay information, wherein minimization of said guard time by said controller includes determining said timeslot assignment based at least in part on the greatest of a first guard time determined from a propagation delay associated with a first node of said determined order and guard times determined from a propagation delay minus the sum of any preceding time slot durations associated with each succeeding nodes of said determined order.

2. A system for controlling scheduling of information communication in a time division duplex communication environment, said system comprising:

a memory storing propagation delay information for a plurality of nodes in communication with a hub; and a controller in communication with said memory and operable under control of an instruction set to determine a time slot assignment to be implemented in said time division duplex communication environment to minimize a guard time thereof through reference to said stored propagation delay information, said time slot assignment having a determination of an order of ones of said plurality of nodes to be provided communications in a communication frame, said order of ones of said plurality of nodes is determined at least in part from a hierarchy of said stored propagation delay information and from an additional communication attribute associated with at least one node, wherein said additional communication attribute is selected from the group consisting of a signal strength indicator, a signal to noise ratio, and a carrier to interference ratio.

3. A method for controlling the scheduling of information communication in a time division duplex communication environment, comprising the steps of:

(a) storing propagation delay information with respect to a plurality of nodes in communication with a hub;

(b) monitoring instantaneous traffic demand associated with ones of said plurality of nodes; and (c) determining a time slot assignment to be implemented in said time division duplex communication environment to minimize a guard time thereof through reference to said stored propagation delay information and said instantaneous traffic demand, comprising the steps of:

(i) determining an order of ones of said plurality of nodes to be provided communications in a time division multiple access frame portion;

(ii) calculating a first guard time from a propagation delay associated with a first node of said determined order;

(iii) calculating additional guard times for each node of said plurality of nodes except said first nodes from a respective propagation delay minus any preceding burst period durations of said time division multiple access frame portion associated with other nodes of said plurality of nodes; and (iv) setting a calculated guard time to zero if the calculated guard time is negative, to thereby control the scheduling of information communication in a time division duplex communication environment.

4. A method for controlling the scheduling of information communication in a time division duplex communication environment, comprising the steps of:

(a) storing propagation delay information with respect to a plurality of nodes in communication with a hub;

(b) monitoring instantaneous traffic demand associated with ones of said plurality of nodes;

(c) determining a time slot assignment to be implemented in said time division duplex communication environment to minimize a guard time thereof through reference to said stored propagation delay information and said instantaneous traffic demand;

(d) monitoring at least one communication attribute associated with ones of said plurality of nodes, said monitored at least one communication attribute includes a communication attribute selected from the group consisting of a signal strength indicator, a signal to noise ratio, and a carrier to interference ratio; and (e) assigning at least one node of said plurality of nodes to an alternate available resource based at least in part on said at least one monitored communication attribute, to thereby control the scheduling of information communication in a time division duplex communication environment.

5. A system for providing information communication between a centralized communication system and a plurality of remote communication systems, said system comprising:
- a processor based traffic scheduler in communication with said centralized communication system and monitoring instantaneous traffic demand associated with ones of said plurality of remote communication systems, wherein said traffic scheduler determines an assignment of resources for providing said information communication between said centralized communication system and ones of said plurality of remote communication systems as a function of said monitored instantaneous traffic demand, said information communication between said centralized communication system and said ones of said plurality of remote communication systems further implements time division duplexing and wherein said guard time minimized is a guard time between a forward link and a reverse link as referenced at said centralized communication system,
- wherein said assignment of resources includes an hierarchical ordering of said ones of said remote communication systems in a time division multiple access frame utilized in providing said information communication between said centralized communication system and said ones of said plurality of remote communication systems, said ordering selected to minimize a guard time implemented in said time division multiple access frame,
- and wherein said guard time is dynamically determined through reference to a propagation delay associated with each remote communication system of said ones of said plurality of remote communication systems and said guard time is dynamically determined from the greatest of a first guard time determined from a propagation delay associated with a first remote communication system of said determined order and guard times determined from a propagation delay minus the sum of any preceding time slot durations associated with each succeeding remote communication systems of said determined order.

6. A system for providing information communication between a centralized communication system and a plurality of remote communication systems, said system comprising:
- a processor based traffic scheduler in communication with said centralized communication system and monitoring instantaneous traffic demand associated with ones of said plurality of remote communication systems, wherein said traffic scheduler determines an assignment of resources for providing said information communication between said centralized communication system and ones of said plurality of remote communication systems as a function of said monitored instantaneous traffic demand,
- wherein said assignment of resources includes an hierarchical ordering of said ones of said remote communication systems in a time division multiple access frame utilized in providing said information communication between said centralized communication system and said ones of said plurality of remote communication systems, said ordering based in part upon a propagation delay associated with respective ones of said plurality of remote communication systems being ordered and upon an additional communication attribute associated with said at least one remote communication system,
- wherein said additional communication attribute includes a communication quality attribute selected from the group consisting of a signal strength indicator, a signal to noise ratio, and a carrier to interference ratio.

* * * * *